United States Patent [19]

Doebel et al.

[11] 3,761,493
[45] Sept. 25, 1973

[54] 3-DIBROMOMETHYLPHTHALIC ANHYDRIDE

[75] Inventors: Karl J. Doebel, Ossining; John E. Francis, Pleasantville, both of N.Y.

[73] Assignee: Ciba-Geigy Corporation, Ardsley, N.Y.

[22] Filed: Oct. 15, 1970

[21] Appl. No.: 81,114

Related U.S. Application Data

[60] Division of Ser. No. 889,795, Dec. 15, 1969, Pat. No. 3,624,108, which is a division of Ser. No. 729,487, April 23, 1968, Pat. No. 3,539,567, which is a continuation-in-part of Ser. Nos. 583,980, Oct. 3, 1966, abandoned, and Ser. No. 539,303, April 1, 1966, abandoned, and Ser. No. 445,762, April 5, 1965, abandoned, said Ser. No. 539,303, is a continuation of Ser. No. 445,762, , said Ser. No. 583,980, is a continuation-in-part of Ser. No. 539,303, , and Ser. No. 445,762.

[52] U.S. Cl. ............................................. 260/346.3
[51] Int. Cl. ............................................. C07c 63/14
[58] Field of Search ................................. 260/346.3

[56] References Cited
UNITED STATES PATENTS
3,573,215   3/1971   Nametz et al.................... 260/346.3

Primary Examiner—Alex Mazel
Assistant Examiner—Bernard Dentz
Attorney—Karl F. Korda, Bruce M. Collins and Martin J. Spellman, Jr.

[57] ABSTRACT

Various derivatives of 8-carboxy-1(2H)phthalazinones are anti-inflammatory agents and chemical intermediates for the preparation of 3-keto-2,3-dihydro-),2,8,9-tetraazaphenalenes.

1 Claim, No Drawings

3-DIBROMOMETHYLPHTHALIC ANHYDRIDE

This is a division of Ser. No. 889,795, filed Dec. 15, 1969, now U. S. Pat. No. 3,624,108, which in turn is a division of Ser. No. 729,487, filed Apr. 23, 1968, now U. S. Pat. No. 3,539,567, which is a continuation-in-part of copending applications Ser. Nos. 583,980, 539,303 and 445,762, filed Oct. 3, 1966, Apr. 1, 1966 and Apr. 5, 1965, the latter three now abandoned respectively; Ser. No. 539,303 being a continuation-in-part of Ser. No. 445,762, and Ser. No. 583,980 being a continuation-in-part of Ser. Nos. 539,303 and 445,762.

DETAILED DESCRIPTION

The present invention relates to a new class of compounds, 8-carboxy-(2H)phtalazinones, and to the use of such compounds in the preparation of 3-keto-2,3-dihydro-1,2,8,9-tetraazaphenalenes.

In particular this invention pertains to compounds of the formula:

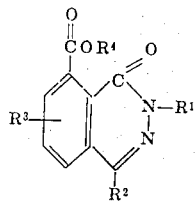

in which
$R^1$ is hydrogen, (lower)alkyl, phenyl, or phenyl(lower)-alkyl;
$R^2$ is hydrogen or phenyl;
$R^3$ is hydrogen, chloro, bromo, hydroxy, (lower)alkoxy, carboxy or nitro; and
$R^4$ is hydrogen or (lower)alkyl.

The term "alkyl" and derivations thereof such as "alkoxy" denotes a straight or branched hydrocarbon chain. When qualified by the designation "(lower)", such chain will contain up to and including six carbon atoms. Illustrative of such alkyl groups are methyl, ethyl, propyl, isopropyl, butyl, sec-butyl, t-butyl, pentyl, hexyl, and the like, while illustrative of such alkoxy groups are methoxy, ethoxy, propoxy, butoxy and the like.

The compounds defined by Formula I are useful chemical entities, both having anti-inflammatory activity and being chemical intermediates for the preparation of 3-keto-2,3-dihydro-1,2,8,9-tetraazaphenalenes, a class of cardiovascular agents described in copending applications Ser. Nos. 583,980, 539,303 and 445,762 referred to above.

The anti-inflammatory properties of these 8-carboxy-1(2H)phtalazinones can be conveniently observed in standard and accepted tests, recognized by pharmacologists as correlating to a specific therapeutic response. For example, anti-inflammatory activity can be observed in the anticarrageenin study, generally performed in the rat, the ultraviolet erythema antagonism test, generally performed in the guinea pig, and in the adjuvant arthritis test, also performed in the rat. This activity is observed in the dosage range of from about 50 to about 500 mg/kg of body weight, the precise dosage depending upon the nature, age and size of the species and the particular indication involved. In the use of these compounds as anti-inflammatory agents, standard modes of administration are comtemplated such as the unit dosage forms of tablets, capsules, powders, granules, syrups, elixirs and the like.

As mentioned above, these 8-carboxy-1(2H)phthalazinones are also valuable chemical intermediates for the production of 3-keto-2,3-dihydro-1,2,8,9-tetraazaphenalenes. Accordingly, an 8-carboxy-1(2H)phthalazinone is heated with hydrazine at reflux temperatures for at least 72 hours in a high boiling ether solvent (one boiling above 80° C) such as methyl cellosolve, diglyme or triglyme, to yield a 3-keto-2,3-dihydro-1,2,8,9-tetraazaphenalene of Formula II:

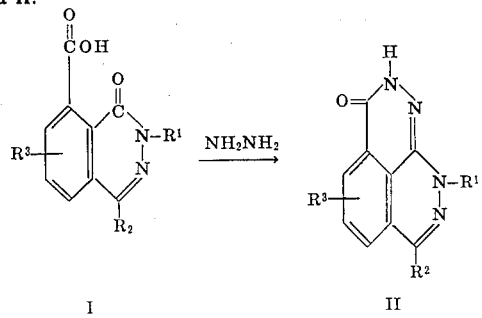

The 3-keto-2,3-dihydro-1,2,8,9-tetraazaphenalenes of Formula II, as described in said copending applications, are cardiovascular agents, in particular, blood-pressure lowering agents. They also manifest coronary and peripheral vascular dilation properties and anti-inflammatory activity.

Although the free 1(2H)phthalazinone-8-carboxylic acids of Formula I ($R^4=H$) can be used in the above reaction with hydrazine, it is preferable to employ the (lower)alkyl esters [$R^4=$ (lower)alkyl] or acid chlorides. Preferred conditions involve the use of hydrazine hydrate in methyl cellosolve.

The 8-carboxy-1(2H)phthalazinones of the present invention are obtained by treating a 3-aldehydophthalic acid, a 3-benzoylphthalic acid, or a functional equivalent of either, with a hydrazine of the formula $R^1NHNH^2$ to yield the corresponding 8-carboxy-1(2H)phthalazinone:

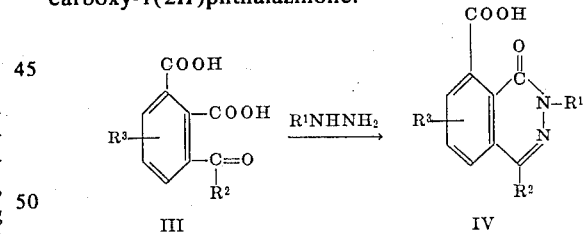

Generally the reaction is easily executed as through heating the reactants, optionally in the presence of a solvent such as alcohol, at temperatures up to about 80° C.

In addition to the 3-carbonylphthalic acids of Formula III, various functional equivalents may be employed. For example, in place of the aldehyde function there can be a dibromomethyl group, as in 3-dibromomethylphthalic acid. The aldehyde group can also be in the form of an acetal. Alternatively, or in addition, the carboxylic acid groups can be esterified or be in the form of an anhydride, as in the case of 2-dibromomethyl-6-carbomethoxybenzoic acid or 3-dibromomethylphthalic anhydride. The 3-aldehydo- or 3-benzoylphthalic acid can also be in its tautomeric form, a 3-hydroxy-7-carboxy phthalide, optionally bearing a phenyl group in the 3-position. In these phthalides, the hydroxy group in the 3-position can be etherified or replaced by a halogen atom, especially bromo, while the carboxylic acid function can be esterified or in the form of an acid halide, as in the case of 3-bromo-7-chlorocarbonylphthalide.

Thus, among the functional equivalents of the phthalic acids of Formula III are compounds of the formulas:

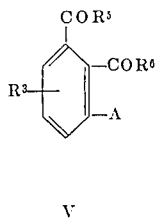
V

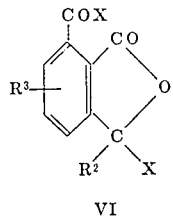
VI wherein

A is an aldehyde, benzoyl, dibromomethyl or dialkoxymethyl group;

each of $R^5$ and $R^6$ is alkyl or $R^5$ and $R^6$ taken together are a divalent oxygen atom; and X is hydroxy, alkoxy, chloro or bromo These important intermediates can be easily prepared via conventional methods. For example, when the known 3-methylphthalic anhydride or a substituted analog thereof is treated with at least two equivalents of N-bromosuccinimide under the influence of light, a 3-dibromomethylphthalic anhydride is obtained. Treatment of this anhydride with aqueous base such sodium hydroxide at from 25° to 90°, followed by acidification with a mineral acid yields 3-aldehydophthalic acid (which in its tautomeric form is 3-hydroxy-7-carboxyphthalide). Esterification under conventional techniques, e.g., an alkanol and a catalytic amount of acid, yields the dialkyl 3-aldehydophthalate (which in its tautomeric form is 3-alkoxy-7-carboalkoxyphthalide).

Likewise bromination of a 2-methyl-6-carbalkoxybenzoic acid (obtained through selective esterification of 3-methylphthalic acid) yields the corresponding 2-dibromomethyl-6-carbalkoxybenzoic acid.

In addition a 7-carboxyphthalide (obtained from a 3-bromomethylphtalic anhydride in a fashion analogous to that described above, i.e., successive treatment with base and acid) is converted to the corresponding 7-halo-carbonylphthalide as with phosphorus oxychloride, thionyl chloride or the like and halogenated in the 3-position with a N-halosuccinimide to yield a 3-halo-7-halocarbonylphthalide.

The 8-carboxy-1(2H)phthalazinones of Formula I wherein $R^1$ is hydrogen can also be converted to the corresponding 8-carboxy 1(2H)phthalazinones wherein $R^1$ is alkyl or phenylalkyl through alkylation, as with an alkyl or phenylalkyl chloride or bromide in aqueous inorganic base or in a (lower)alkanol in the presence of alkali hydroxide or alkali alkoxide. In this conversion it is generally preferable to first esterify a free carboxy group in the 8-position, as through formation of the acid chloride and treatment with an alkanol.

A particularly valuable class of compounds are those of Formula I wherein $R^1$ is hydrogen, lower alkyl, phenyl or phenethyl, $R^2$ is hydrogen or phenyl, $R^3$ is hydrogen and $R^4$ is hydrogen, methyl or ethyl.

The following examples will serve to further typify the nature of this invention but should not be construed as a limitation thereof.

EXAMPLE 1

3-Dibromomethylphthalic Anhydride

A mixture of 3-methylphthalic anhydride (81 g), N-bromosuccinimide (182 g), benzoyl peroxide (40 mg) and carbon tetrachloride (1,500 ml) is heated and irradiated at reflux by a 100 Watt insertion-type ultraviolet lamp under stirring and exclusion of moisture. After the mixture becomes brick red, an additional 40 mg of benzoyl peroxide is added. Illumination at reflux is carried out during 24 hours. The mixture is cooled and filtered free of succinimide and the filtrate is evaporated in vacuo. The residual yellowish brown solid is dissolved in hot ether, treated with decolorizing charcoal and filtered. Addition of hexane to the filtrate affords the crystalline product, 3-dibromomethylphthalic anhydride, m.p. 90.5°-93° C in 72 percent yield. Two recrystallizations from ether-hexane yield colorless needles melting at 93-95°C.

Calcd. for $C_9H_4Br_2O_3$: C, 33.78; H, 1.26; Br, 49.92; Found: 33.66; 1.20; 49.41.

EXAMPLE 2

3-Hydroxy-7Carboxyphthalide $\alpha,\alpha$-Dibromo-3methylphthalic anhydride (40 ) is added in portions to a hot solution of 2N sodium hydroxide (500 ml) with stirring. After 10 minutes, the clear solution is rendered strongly acidic with concentrated hydrochloric acid and heated for ½ hour at 80°. The solution is evaporated to dryness in vacuo and the residue is then dissolved in hot water (600 ml), treated with decolorizing charcoal and filtered. After 3 days at 5° C, the colorless filtrate yields 21.3 g (88%) of colorless blocks of 3-hydroxy-7-carboxyphthalide, m.p. 165.5°-168.5° C, after two further crystallizations from water.

Calcd. for $C_9H_6O_5$: C, 55.68; H, 3.12; Found: 55.98; 2.99.

EXAMPLE 3

3-Bromo-7-Carbethoxyphthalide a. 7-Carboxyphthalide. Cride 3-bromomethylphthalic anhydride (47.6 g) prepared according to the procedure of Albisetti, Barney Cairns and Winberg, U.S. Pat. No. 2,729,622 is dissolved in ethanol (100 ml) and aqueous 2N sodium hydroxide (500 ml) and heated for 15 minutes at 80°. The pale yellow solution is cooled, rendered acidic with concentrated hydrochloric acid, heated at 80° for 1 hour and refrigerated overnight. The acid (35.4 g, m.p. 166-9°C) separates in buff crystals. Two recrystallizations from methanol yield colorless blocks, m.p. 168.5°-171°C.

Calcd: C, 60.66; H, 3.40; Found: 60.41; 3.35.

b. 7-Phthalidylcarbonyl chloride. A mixture of 7-carboxy-phthalide (38.54 g) thionyl chloride (27 ml) and dry benzene (108 ml) is heated at reflux with exclusion of moisture for 3 hours. The excess solvent and thionyl chloride are removed by distillation in vacuo and the solid residue is recrystallized from benzene-hexane. The yield of product, m.p. 92°-96.5° C, is 30.78 g, or 73% of theory.

c. 7-Carbethoxyphthalide. 7-Phthalidylcarbonyl chloride (30.78 g) and absolute ethanol (184.5 ml) are heated under reflux under moisture exclusion for 30 minutes. The solvent is partially evaporated, whereupon the first crop of product crystallizes. The mother liquors are evaporated in vacuo in dryness, triturated with ethanol and filtered. The two crops are recrystallized from benzene and 23.1 g (65%) of product, m.p. 89.5°–92.5° C are obtained. Recrystallization from ethanol yields the pure ester, m.p. 90.5°–92° C.
Calcd: C, 64.07; H, 4.89;
Found: 64.10; 4.88.

d. 3-Bromo-7-carbethoxyphthalide. A mixture of 7-carbethoxyphthalide (17.78 g), N-bromosuccinimide (15.52 g), carbon tetrachloride (345 ml) and benzoyl peroxide (40 mg) is brought to incipient reflux with stirring and exclusion of moisture and then illuminated with a 250 Watt tungsten lamp. No color change is apparent but after 25 minutes, all of the N-bromosuccinimide has been coverted to succinimide. The mixture is cooled, filtered and the filtrate evaporated in vacuo to 25.2 g of the product as an amber oil. The infrared spectrum of the oil shows peaks at 1720 cm$^{-1}$ (ester) and 1800 cm$^{-1}$ ($\gamma$-lactone).

EXAMPLE 4

8'-Carboxy-1(2H) phthalazinone

A mixture of 3-hydroxy-7-carboxyphthalide (30.2 g), 100% hydrazine hydrate (50 ml) and water (100 ml) is heated under reflux for 16hours. The yellow mixture which forms is then rendered acidic under stirring with dilute hydrochloric acid. The pasty mass which forms is filtered, washed with water and dried at 100° in vacuo. 8-Carboxy-1(2H)phthalazinone, m.p. 300.5°–306° C, is obtained in a yield of 99%, and is recrystal-lized once from glacial acetic acid, m.p. 303.5°–306° C.
Calcd. C, 56.84; H, 3.18; N, 14.73;
Found: 57.02; 3.15; 14.65.

8-Carboxy-1(2H) phthalazinone can also be directly obtained from $\alpha,\alpha$-dibromo-3-methylphthalic anhydride by refluxing with hydrazine hydrate, either 100% hydrazine hydrate in chloroform or 50% aqueous hydrazine in ethanol.

EXAMPLE 5

8-Carbomethoxy-1(2H)phthalazinone

To a cold stirring suspension of 8-carboxy-1(2H)-phthalazinone (7.6 g) in absolute methanol (100 ml) is added an ethereal solution of diazomethane (approx. 0.1 mole). The mixture is stirred under moisture exclusion overnight at room temperature and then evaporated in vacuo. The resultant yellow powder (8.9 g) is triturated with cold dilute sodium carbonate and filtered. Recrystallization of the dried solid (6.25 g), m.p. 205°–208° C, from methanol yields pure 8-carbomethoxy-1(2H)-phthalazinone, m.p. 207°–209° C
Calcd: C, 58.82; H, 3.95; N, 13.72;
Found: 58.77; 3.99 13.86.

Alternatively, this compound may be made as follows: To a suspension of 8-carboxy-1(2H)phthalazinone (182 g) in chlorobenzene (1,200 cc) is added thionyl chloride (250 cc). This mixture is stirred at reflux with moisture exclusion for four hours, cooled and filtered. The white precipitate is washed with benzene, air dried, and suspended in absolute methanol (1,500 cc). This mixture is heated at reflux under moisture exclusion for 18 hours, cooled to 0° and filtered. The solid thus collected is washed with cold absolute methanol and air dried, m.p. 213°–215° C.

EXAMPLE 6

8-Carbethoxy-1(2H)phthalazinone

3-Bromo-7-carbethoxyphthalide (25.2 g) is dissolved in absolute ethanol (172 ml), whereupon a white precipitate forms. 100% Hydrazine hydrate (17.25 ml) in absolute ethanol (172 ml) is added dropwise with stirring and cooling and the mixture is heated at reflux for 16 hours and then filtered free of the white precipitate. The filtrate is evaporated to dryness in vacuo, triturated with 1N hydrochloric acid (150 ml) and filtered. The resulting insoluble yellow precipitate and the filtrate are extracted separately with chloroform. The extracts are combined and concentrated in vacuo to a yellow solid (7.15 g). This crude ester is purified by chromatography over neutral alumina and recrystallized from ethanol to yield the product as colorless blocks, m.p. 169.5°–171.5°C.
Calcd: C, 60.54; H, 4.62; N, 12.84;
Found: 60.54; 4.62; 12.62.

EXAMPLE 7

2-Methyl-8-Carbethoxy-1(2H)phthalazinone

8-Carbethoxy-1(2H)phthalazinone (6 g) is dissolved almost completely in 2N sodium hydroxide (22 ml) and water (22 ml). More water (100 ml) is added, followed by dimethylsulfate (6 ml) dropwise under stirring. An oil forms at first but it slowly crystallizes. After 1 hour, the acidic solution is basified with 5 ml of 2N sodium hydroxide. Methylsulfate (1.8 ml) is again added dropwise under stirring and the mixture stirred for 16 hours at room temperature. The white precipitate which forms is collected, washed with cold water and dried in vacuo. The filtrate is made slightly basic and extrated several times with chloroform. Concentration of the chloroform layer yields a pale yellow solid whose infrared spectrum is identical to the first crop of material. The first crop is recrystallized from benzenecyclohexane with the aid of decolorizing carbon in white needles melting in the range 103.5°–105°.
Calcd. for $C_{12}H_{12}N_2O_3$: C, 62.06; H, 5.21; N, 12.07;
Found: 62.25; 5.50; 11.98.

The infrared spectrum (chloroform) shows prominent bands at 1735 cm$^{-1}$ (ester carbonyl) and 1655 cm$^{-1}$ (amide carbonyl).

Alternatively, compounds of this type, such as 2-methyl-8-carbomethoxy-(2H)phthalazinone can be prepared via the following prodecure: 8-Carbomethoxy-1(2H)phthalazinone (2.04 g) obtained through the use of methanol rather than ethanol in part (c) is dissolved in warm absolute methanol (70 ml) and treated under stirring with sodium methoxide (0.60 g), whereupon a solution forms. Methyl iodide (0.63 ml) is added and the whole refluxed under exclusion of moisture for one hour, then stirred at room temperature for 16 hours. The orange-yellow solution is evaporated to small volume, traated with warm water and filtered. As the filtrate cools, colorless crystals precipitate from it. The product is collected and washed with cold water. This material, m.p. 115°–121.5°, is purified by two crystallizations from water whereupon it melts at 125°–126°.

EXAMPLE 8

2-Phenyl-8-Carboxy-1(2H)Phthalazinone

A mixture of phenylhydrazine (3.6 ml), 3-hydroxy-7-carboxyphthalide (5.82 g) and glacial acetic acid (100 ml) is heated under reflux for 18 hours. The clear solution is evaporated to dryness in vacuo and the residual solid triturated with methanol and collected. The product (6.97 g), m.p. 197°–199°, is recrystallized from benzene and a colorless crystalline product, m.p. 197°–198°, obtained.
Calcd. for $C_{15}H_{10}N_2O_3$: C, 67.66; H, 3.79; N, 10.52
Found: 67.28; 3.75; 10.82
The infrared spectrum (Nujol) shows prominent peaks at 1720 cm$^{-1}$ (carboxyl group) and 1,650 cm$^{-1}$ (amide carbonyl).

EXAMPLE 9

2-Phenyl-8-Carbethoxy-1(2H)Phthalazinone

To a solution of thionyl chloride (40 ml) in chlorobenzene (150 ml) is added under stirring 8-carboxy-2-phenyl-1(2H)phthalazinone (24.3 g) and the mixture heated at reflux under moisture exclusion for 2 hours. When the evolution of gas has ceased, the solution is evaporated to dryness in vacuo. The residual white solid (24.7 g) is treated with absolute ethanol (350 ml) and heated under reflux for 18 hours. The solution is filtered hot and allowed to cool slowly. The ester precipitates in colorless needles, m.p. 150°–151°. This material (23.9 g) is recrystallized from ethanol. The melting point is unchanged.
Calcd. for $C_{17}H_{14}N_2O_3$: C, 69.37; H, 4.79; N, 9.52;
Found: 69.08; 4.65; 9.36.

EXAMPLE 10

4-Phenyl-8-Carboxy-1(2H)Phthalazinone

3-Benzoylphthalic acid (32.5 g) prepared by permanganate oxidation of 2-methyl-6-benzoylbenzoic acid, hydrazine hydrate (85 ml) and water (145 ml) are heated at reflux for 18 hours. The mixture is cooled and rendered acidic with hydrochloric acid. The solid which precipitates is recrystallized from glacial acetic acid to yield 4-phenyl-8-carboxy-1(2H)-phthalazinone, m.p. 257°–259°.
Calcd. for $C_{15}H_{10}N_2O_3$: C, 67.66; H, 3.79; N, 10.52;
Found: 67.87; 3.68; 10.82.

EXAMPLE 11

4-Phenyl-8-Carbomethoxy-1-(2H)Phthalazinone

A mixture of 4-phenyl-8-carboxy-1(2H)phthalazinone (19.0 g), thionyl chloride (32 ml) and chlorobenzene (115 ml) is stirred at reflux under moisture exclusion for 3 hours. The solution is concentrated at reduced pressure to a white solid which is dissolved in methanol (300 ml) and heated at reflux for 18 hours. The mixture is cooled and the crystalline ester, m.p. 198°–202° collected.

EXAMPLE 12

2-(2-Phenethyl)-8-Carboxy-1(2H)Phthalazinone

To a mixture of anhydrous sodium acetate (28.4 g) glacial acetic acid (1,300 ml) and 2-phenethylhydrazine sulphate (26.0 g) is added 3-hydroxy-7-carboxyphthalide (19.4 g). The mixture is stirred at reflux for 18 hours, filtered hot and evaporated to dryness. The residue is triturated with chloroform and the chloroform layer is extracted with 5% sodium carbonate solution. The alkaline extracts are cautiously rendered acidic with 6N hydrochloric acid and the material which precipitates is extracted with chloroform. The dried chloroform extracts are evaporated to dryness and the residue is taken up in boiling benzene, filtered and slowly treated with hexane. The white precipitate which forms is collected, washed with hexane and dried. The product (m.p. 115°–123°) can be further purified through recrystallization from ethanol-water. (m.p. 119°–122°C).
Calcd. for $C_{17}H_{14}N_2O_3$: C, 69.37; H, 4.79; N, 9.52;
Found: 69.40; 4.67; 9.48.

EXAMPLE 13

2-(2-Phenethyl)-8-Carbomethoxy1(2H)Phthalazinone

A mixture of 2-(2-phenethyl)-8-carboxy-1(2H)phthalazinone (8.0 g), thionyl chloride (13 ml) and chlorobenzene (60 ml) is heated at reflux with stirring and exclusion of moisture for 2.5 hours. The solution is then evaporated to dryness at reduced pressure and the residue heated with absolute methanol (200 ml) at reflux for 66 hours. The mixture is filtered hot and the filtrate cooled at −20° C overnight. The precipitated product is collected, washed with a little cold methanol, dried and recrystallized from methanol, m.p. 113°–114°.
Calcd. for $C_{18}H_{16}N_2O_3$: C, 70.11; H, 5.23; N, 9.09;
Found: 70.00; 5.23; 8.95.

EXAMPLE 14

2-Isopropyl-8-Carbomethoxy-1(2H)Phthalazinone

8-Carbomethoxy-1(2H)phthalazinone (20.4 g) is suspended in methanol (250 ml) and treated with a mixture of 2-iodopropane (17 g), 1N sodium hydroxide (100 ml) and methanol (100 ml). This mixture is stirred on the steam bath for 3 hours and then evaporated to dryness at reduced pressure and recrystallized from methanol to yield the product.

EXAMPLE 15

2-Ethyl-8-Carbethoxy-1(2H)Phthalazinone

8-Carbethoxy-1(2H)phthalazinone (3.0 g) is dissolved in 2N sodium hydroxide (11.0 ml). Water (60 ml) is added, followed by diethylsulfate (4.2 ml) dropwise under stirring. The mixture is stirred 60 hours at room temperature and then brought to pH 4 with a few drops of 2N sodium hydroxide. The mixture is stirred 2 hours longer, and the oily mixture extracted with chloroform. The chloroform layer is dried over sodium sulfate and concentrated in vacuo. The product is purified by distillation in a Spaeth apparatus at 0.03 mm with an air bath temperature of 160°. The I.R. spectrum of the product in chloroform reveals strong bands at 1,735 cm$^{-1}$ (ester carbonyl) and 1,655 cm$^{-1}$ (amide carbonyl).

EXAMPLE 16

3-Keto-2,3-Dihydro-1,2,8,9-Tetraazaphenalene

A solution of 8-carbomethoxy-1(2H)phthalazinone (1.02 g), prepared as in Example 5, in 100% hydrazine hydrate (5 ml) and absolute ethanol (20 ml) is heated at reflux for 110 hours, then is cooled and filtered. The precipitate is washed with water, then methanol and dried in vacuo. The yield of 3-keto-2,3-dihydro-1,2,8,9-tetraazaphenalene, m.p. >350° C is 0.78 g, or 84% of theory.

EXAMPLE 17

3-Keto-9-Methyl-2,3-Dihydro-1,2,8,9-Tetraazaphenalene

To a solution of hydrazine hydrate (5 ml) in methylcellosolve (20 ml) is added 2-methyl-8-carbethoxy- 1(2H)-phthalazinone (1.16 g), prepared as in Example 7. The whole is stirred at reflux for 26 hours, during which time a yellow solution forms. The solution is filtered hot and the filtrate allowed to cool under refrigeration. The yellow crystals which precipitate are collected, washed with methanol and dried. The mother liquor is evaporated to dryness in vacuo and the residue triturated with hot methanol and filtered. The precipitate is a second crop of the product. The combined material, m.p. 300°–304°, (386 mg) is recrystallized from methyl cellosolve and the pure product obtained in bright yellow needles, melting at 305°–306°.

Calcd. for $C_{10}H_8N_4O$: C, 59.99; H, 4.03; N, 27.99; Found: 59.91; 4.18; 28.12.

EXAMPLE 18

3-Keto-9-Ethyl-2,3-Dihydro-1,2,8,9-Tetraazaphenalene

2-Ethyl-8-carbethoxy-1(2H)phthalazinone (1.6 g), prepared as in Example 15, is suspended in a mixture of hydrazine hydrate (5.7 ml) and methyl cellosolve (23 ml) and heated at reflux for 96 hours. The resulting yellow solution is evaporated to dryness in vacuo and the yellow residue triturated with methanol and filtered. The precipitate (0.5 g) is recrystallized from water and the pure product obtained as yellow needles, m.p. 218°–219°.

Calcd. for $C_{11}H_{10}N_4O$: C, 61.67; H, 4.71; N, 26.15; Found : 61.42; 4.79; 26.07.

The infrared spectrum (Nujol) shows a strong amide carbonyl band at 1650 cm$^{-1}$.

In a similar fashion from 2-isopropyl-8-carbomethoxy-1(2H)phthalazinone, there is obtained 3-keto-9-isopropyl-2,3-dihydro-1,2,8,9-tetraazaphenalene, m.p. 258°–259°C.

EXAMPLE 19

3-Keto-9-Phenyl-2,3-Dihydro-1,2,8,9-Tetraazaphenalene

A mixture of 2-phenyl-8-carbethoxy-1(2H)phthalazinone (11.76 g) prepared as in Example 9, 100% hydrazine hydrate (40 ml) and methyl cellosolve (160 ml) is heated at reflux for 25 hours. The yellow solution is filtered and treated with methanol (100 ml) followed by water dropwise under stirring. A flocculent yellow precipitate forms. The mixture is cooled and the product collected, washed thoroughly with water and ethanol and dried in vacuo. The solid (4.44 g), m.p. 254–6°, is recrystallized from methyl cellosolve and obtained as yellow needles, m.p. 255–7°

Calcd. for $C_{15}H_{10}N_4O$: C, 68.70; H, 3.85; N, 21.37; Found: 68.81; 3.90; 21.20.

EXAMPLE 20

3-Keto-9-(2-Phenethyl)-2,3-Dihydro-1,2,8,9-Tetraazaphenalene

A mixture of 2-(2-phenethyl)-8-carbomethoxy-1(2H)-phthalazinone (32.5 g), 100% hydrazine hydrate (400 cc) and water (70 cc) is stirred at reflux for 20 hours and then cooled. The yellow precipitate is collected, washed thoroughly with water, air dried, and recrystallized twice from chloroform to afford the product, m.p. 203–5°.

Calcd. for $C_{17}H_{14}N_4O$: C, 70.32; H, 4.86; N, 19.30; Found: 70.13; 4.87; 19.33.

EXAMPLE 21

3-Keto-7-Phenyl-2,3-Dihydro-1,2,8,9-Tetraazaphenalene

A mixture of 4-phenyl-8-carbomethoxy-1(2H)phthalazin-one (18.6 g), hydrazine hydrate (400 cc) and water (100 cc) is heated at reflux for 20 hours. The mixture is cooled and the precipitate is collected, washed with water and recrystallized from methyl cellosolve to yield the product, m.p. above 350° C.

Calcd. for $C_{15}H_{10}N_4O$: C, 68.70; H, 3.85; N, 21.37; Found: 68.89; 3.62; 21.39.

EXAMPLE 22

3-Keto-2,3-Dihydro-1,2,8,9-Tetraazaphenalene

A suspension of $\alpha,\alpha$-dibromo-3-methylphthalic anhydride (80 g) in ethanol (500 ml) is treated with a solution of 100% hydrazine hydrate (100 ml) and water (100 ml) dropwise under stirring and cooling. A white suspension forms. After the addition, the temperature is raised gradually to reflux, whereupon the white suspension disappears and a yellow precipitate forms. After 88 hours at reflux, the mixture is cooled, filtered and the first crop of product is washed with water and ethanol and dried in vacuo. The mother liquors are evaporated in vacuo, dissolved in 500 ml of glacial acetic acid and heated under reflux for 18 hours. The mixture is cooled and filtered and a second crop of the product obtained. The overall yield of 3-keto-2,3-dihydro-1,2,8,9-tetraazaphenalene, m.p. >347°, is 25.7 g, or 55% of theory. The product is recrystallized from 3 liters of boiling dimethylformamide and obtained as a yellow power which, on heating, forms a microcrystalline solid at 220°–270°C. and melts above 350° C.

Calcd. C, 58.06; H, 3.25; N, 30.09; Found: 57.92; 3.58; 30.28; 58.03; 3.52.

What is claimed is:
1. 3-dibromomethylphthalic anhydride.

* * * * *